United States Patent

[11] 3,584,474

| [72] | Inventor | Robert M. Church<br>126 Knox Drive, West Lafayette, Ind. 47906 |
|---|---|---|
| [21] | Appl. No. | 854,517 |
| [22] | Filed | Sept. 2, 1969 |
| [45] | Patented | June 15, 1971 |

[54] SPINDLE COUPLING
12 Claims, 8 Drawing Figs.

[52] U.S. Cl. .................................................. 64/9
[51] Int. Cl. .................................................. F16d 3/18
[50] Field of Search ..................................... 64/9, 16

[56] References Cited
UNITED STATES PATENTS
1,648,078 10/1927 Thomson ..................... 64/9 R
2,744,449 5/1956 Belden et al. ................. 64/9
3,054,275 9/1962 Ongaro .......................... 64/9

Primary Examiner—Mark M. Newman
Assistant Examiner—Randall Heald
Attorney—Hobbs & Green ABSTRACT: A spindle coupling for connecting two unaligned shafts in driving relation in which flanges are mounted on the unaligned shafts and are provided with sleeves having openings facing one another and grooves on the internal walls thereof. Carriages are mounted in the grooves and are held in spaced relation from the sidewalls thereof by bearing races to facilitate easy movement of the carriages in the respective grooves. A spindle shaft interconnects the two flanges and contains radial members at each end having teeth thereon for engaging the reciprocating carriages in driving relationship.

INVENTOR.
ROBERT M. CHURCH
BY Hobbs & Green
ATTORNEYS

SPINDLE COUPLING

The conventional spindle coupling is used to connect two disaligned shafts for transmission of torque from the power input to the power output shaft and consists basically of a flange on each of the two shafts and a spindle shaft having hubs at each end with a series of teeth on the periphery thereof for meshing with internal teeth on the flanges. This type of coupling permits substantial disalignment of the power input and output shafts without a serious decrease in the efficiency of the power transmission installation. However, in some installations where the lateral displacement of the shafts from one another is substantial, the friction and resistance cause a significant reduction in the operating efficiency of the coupling as well as excessive wear to the parts in sliding engagement in reciprocating relationship with one another, thus requiring appreciable downtime of the equipment and excessive service and repair costs. It is therefore one of the principal objects of the present invention to provide a spindle coupling in which loss of power between the two disaligned shafts is minimized and in which no substantial wear occurs between the reciprocating parts.

Another object of the invention is to provide a spindle coupling which will operate efficiently with substantially greater angularity between the disaligned shafts and the spindle shaft than in the conventional spindle coupling installations, and which will operate under those conditions for extended periods of time without any substantial wear or stress on the input and output shafts of the interconnected equipment.

Still another object of the invention is to provide a relatively simple and efficient torque transmission coupling which will accommodate large angular or offset disalignment of the driving and driven shafts and more efficiently transmit high torsional power transition without slip and without varying the angular velocity of the driven shaft from that of the driving shaft, and which will transmit larger horsepower at higher speeds and at larger disalignments without generation of excessive frictional heat or resulting in the shorter service life inherent in the conventional coupling of this type subjected to the foregoing conditions.

Further objects and advantages of the present invention will become apparent from the following description and accompanying drawings, wherein:

FIG. 4 is a fragmentary view similar to that shown in FIG. 3, illustrating a modified form of the invention;

FIG. 6 is a cross-sectional view similar to the cross-sectional view of FIG. 2, illustrating a still further modified form of the invention;

Figure 8:
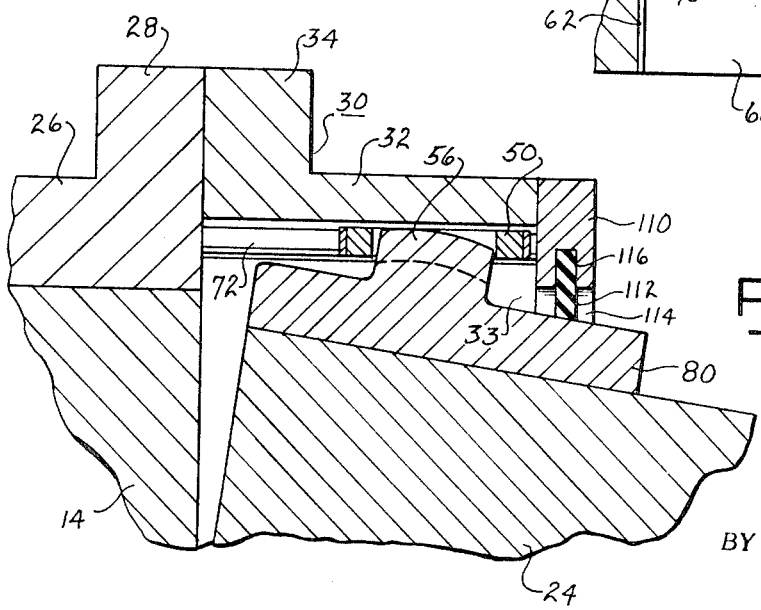

FIG. 7 is a fragmentary cross-sectional view showing further details of the modified form of FIG. 6, the section being taken on line 7-7 of the latter figure; and FIG. 8 is an enlarged fragmentary cross-sectional view of a sleeve and hub showing the internal relationship of the sleeve and hub and illustrating in greater detail the hub and sleeve structure generally, as well as a further modified form of the present invention.

Figure 1:
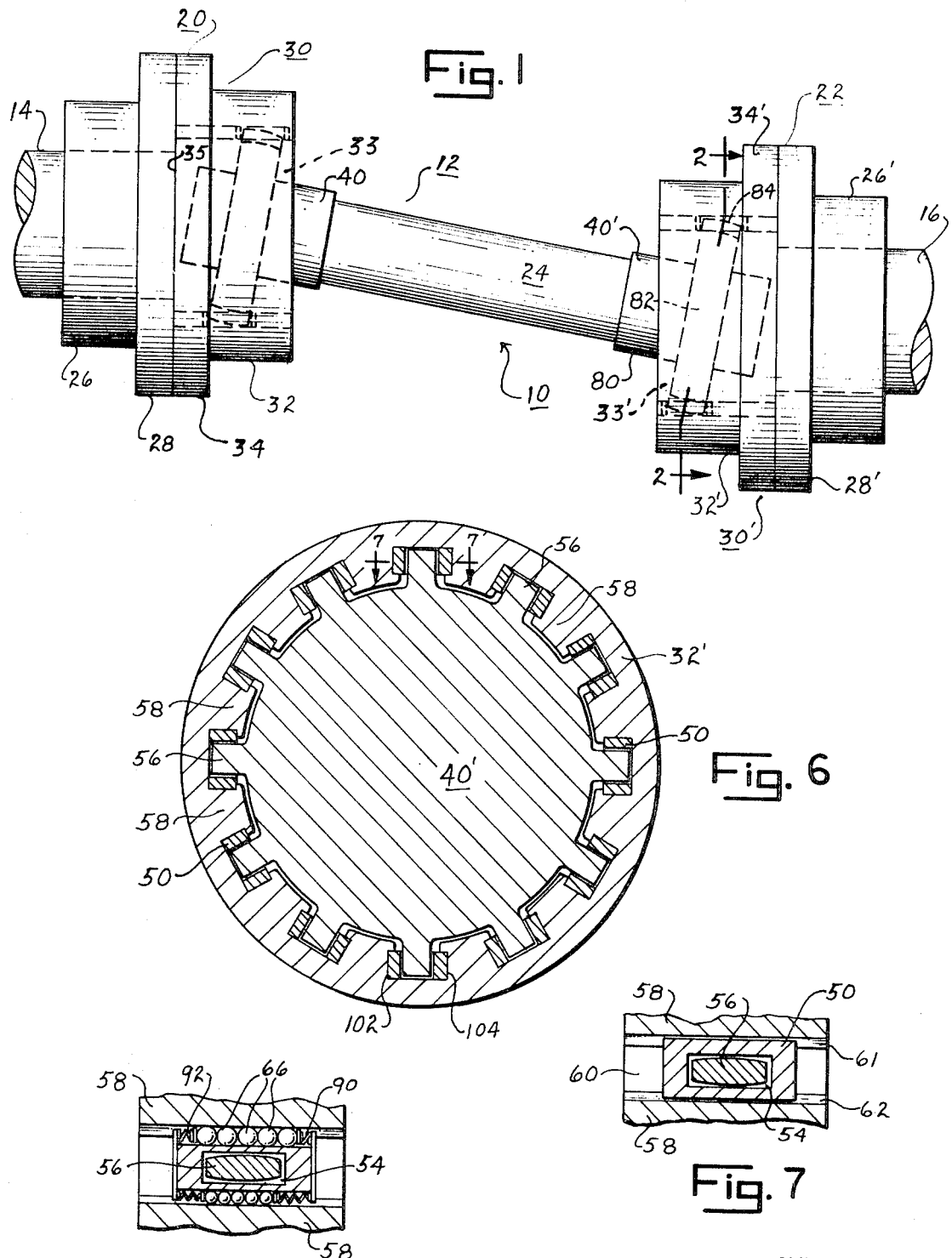
FIG. 1 is a side elevational view of the present spindle coupling showing the coupling connected to a driving and driven shaft in disaligned relationship.

Referring more specifically to the drawings and to FIG. 1 in particular, numeral 10 designates generally a power transmission installation in which the present coupling 12 is used to connect power input or driving shaft 14 and a power output or driven shaft 16. The two shafts are shown in disaligned relationship, by design and construction, and are not merely the unintentional misalignment frequently occurring between driving and driven shafts. The two shafts shown, for example, may be a shaft of a motor and the input shaft of equipment driven by a motor. The disalignment of the two shafts may be varied over a relatively wide angular range in an installation having the present spindle coupling incorporated therein, and the present coupling is capable of adapting itself to substantial disalignment of the two shafts and to substantial variations in the disalignment.

The present spindle coupling consists basically of flanges 20 and 22 mounted on the driving and driven shafts 14 and 16, respectively, and a spindle shaft 24 interconnecting the two flanges. The two flanges 20 and 22 are essentially the same, and hence only one will be described in detail herein with the same numbers with primes being used to identify like parts on the other flange. The flanges consist of a collar 26 secured rigidly to shaft 14 and having outwardly extending radial flange 28 joined integrally to collar 26. Rigidly secured to radial flange 28 by bolts, screws or other suitable securing means, is a sleeve 30 having cylindrical portion 32 with a cylindrical cavity 33 and a radial flange portion 34 with a radial face 35 seating firmly against the corresponding radial face of flange 28. The cylindrical portion 32 and the radial flange portion 34 are joined integrally to one another and are preferably formed as a single piece. Spindle shaft 24 extends between the two sleeves, and hubs 40 and 40' are mounted on opposite ends of the shaft and extend into cavities 33 and 33' in the two opposed sleeves of flanges 20 and 22, respectively.

Basically, sleeves 30 and 30' and hubs 40 and 40' contain internal and external teeth intermeshing with one another for transmitting the torque forces between the hubs and the respective sleeves. In the past, the general construction of the spindle type coupling resulted in a high frictional component in the operation, particularly when substantial angularity existed between the spindle shaft and the driving and driven shafts, as well as resulting in inefficient operation, causing a substantial decrease in the torque transmission from the driving to the driven shaft. In the present spindle coupling the frictional component and the loss in torque transmittal efficiency has been greatly decreased by the construction of the embodiments illustrated in the drawings. The internal teeth on sleeve 30 and external teeth on hub 40 and on sleeve 30' and hub 40', are interconnected by carriages 50 mounted in longitudinal grooves in the internal surface of the sleeve for reciprocating movement therein and having center slots 54 for receiving the teeth 56 of the hub. The internal teeth on the sleeve in effect are the intervening portions 58 between grooves 60 which are equally spaced around the internal periphery of the sleeve, and in which the carriages 50 are disposed. The carriages 50 are retained in place in grooves 60 by shoulders 61 and 62 disposed at the inner edges of grooves 60 and extending the full length thereof. Grooves 60 are open at the outer end of cavity 33 to permit the carriages to be easily assembled in grooves 60. The ends of these grooves, however, may be closed to protect the moving parts from dirt and other foreign matter, as will be more fully described hereinafter.

Figure 2:
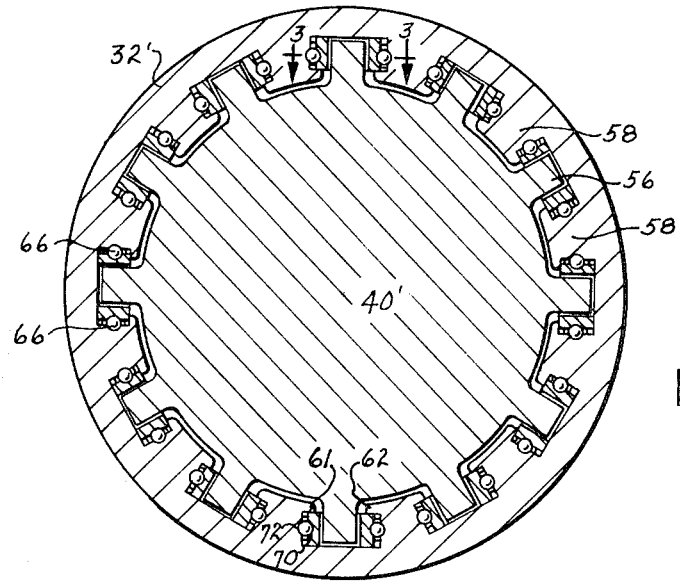
FIG. 2 is a cross-sectional view through a sleeve and hub portion of the coupling shown in FIG. 1.
Figure 3:
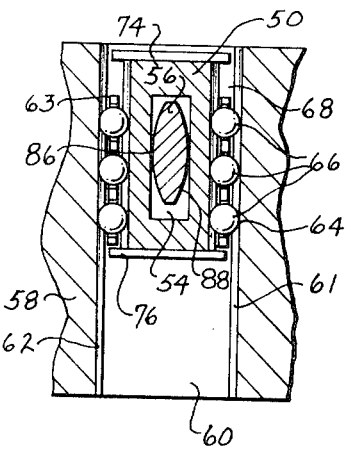
FIG. 3 is an enlarged fragmentary cross-sectional view of a portion of the sleeve and hub construction, the section being taken on line 3-3 of FIG. 2.

In the embodiment of the invention disclosed in FIGS. 2 and 3, the carriage 50 is mounted on ball bearing races 63 and 64 along opposite sides of the carriage. The ball bearing structure includes three ball bearings 66 and a cage 68 therefor. The balls extend beyond the cages and are seated in grooves 70 and 72 in the side of the carriage and the adjacent side of each tooth 58. The ball bearing races are slipped into position from the open end of the grooves 60 as carriage 50 is mounted in the grooves, and the carriages are mounted in the grooves at the same time that hubs 40 and 40' are assembled in the respective sleeves. The ball bearing races are retained in place along the side of the respective carriage by outer and inner end plates 74 and 76 secured to the ends of the respective carriages by screws or other suitable securing means (not shown).

The two hubs 40 and 40' consist of a cylindrical portion 80 and a radially extending angular member 82 on which teeth 56 are disposed, portion 80, member 82, and teeth 56 being formed as an integral unit. The teeth have a curved outer end 84 corresponding substantially to the curvature inscribed by the periphery of the teeth as the sleeve and hub rotate in unison with the shafts 14 and 16 in offset relation. The teeth 56 also are provided with opposite arcuate sidewalls 86 and 88 in order to reduce friction between teeth 56 and the sidewalls of slots 54.

In the operation of the spindle coupling shown in FIGS. 1, 2, and 3, with flanges 20 and 22 mounted on the shafts 14 and 16, respectively, in the manner illustrated in FIG. 1, rotation of the input or driving shaft 14 transmits torque to teeth 56 on hub 40, causing the spindle shaft 24 to rotate, which in turn rotates flange 22. As the shaft 14 drives shaft 16 through the coupling, teeth 56 reciprocate in carriages 50 with the torque of shaft 14 being transmitted through ball bearing race 63 or 64, depending on the direction of rotation, and through carriages 50 and teeth 56 of hub 40. The torque is likewise transmitted from the hub 40' to the sleeve 30' and thence through flanges 34' and 28' to shaft 16. The ball bearing races permit the carriages to move freely in grooves 60 with little frictional resistance, thus permitting the full torque to be delivered to shaft 14 and effectively transmitted through the coupling to shaft 16.

The embodiment shown in FIG. 4 is similar to that shown in FIGS. 1 through 3, except that the balls 66 are not mounted in a cage but rather are retained in place by end plates 74 and 76 and springs 90 and 92 at opposite ends of the row of balls, and the balls are likewise seated in opposed grooves such as grooves 70 and 72 of the carriage and teeth 56. The ball bearings may be of different sizes on opposite sides of the carriage if desired, as illustrated in FIG. 4. The construction and operation of the carriages and the intermeshing teeth are essentially the same as those described in the embodiments previously described herein.

Figure 5:
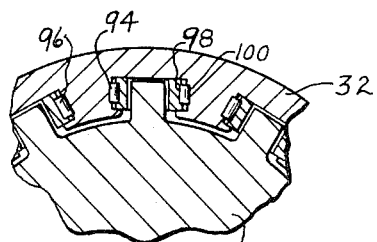
FIG. 5 is an enlarged fragmentary cross-sectional view similar to that shown in FIG. 2, illustrating a further modified form of the invention.

The embodiment of FIG. 5 is similar to the embodiment of FIGS. 1, 2, and 3; however, instead of using ball bearings, a race of roller bearings 94 and 96 is substituted therefor. The rollers are seated in grooves 98 and 100 in the sides of the carriages and in the sides of teeth 56. The races of roller bearings are retained in place by end plates 74 and 76 as in the previous embodiment. In the embodiment of FIGS. 6 and 7 the configuration of the teeth 56 and the overall construction of carriages 50 are the same as those shown in the previous embodiments; however, the design shown in this embodiment is a simplified bearing structure in which plain bearings 102 and 104 are used in place of the ball bearings and roller bearings of the previous embodiments. This latter modification is intended primarily to illustrate the adaptability of the present carriage and tooth construction, regardless of the type of mountings of the carriage. The carriage is retained in the groove by shoulders 61 and 62 in the same manner as in the previous embodiments. Like numerals are given to like parts where those parts are the same as in the previous modifications.

The enlarged fragmentary cross-sectional view of FIG. 8 is intended to illustrate more effectively the operation of the various embodiments of the present invention and to show one means of closing the end of the sleeve 30. The numerals used in this embodiment are the same as those in the previous embodiments, and the types of bearings would normally be the same as those shown in the embodiments of FIGS. 1 through 5. In the view of FIG. 8, the ends of grooves 60 are closed by an annular member 110 secured by screws or other suitable securing means (not shown), to the end of sleeve 30. In order to seal cavity 33 and round hub portion 80, a seal 112, preferably of rubber or rubberlike material, is disposed in opening 114 of annular member 110. The seal 112 engages the periphery of cylindrical portion 80 of hub 40 with sufficient pressure to exclude most foreign material and moisture and to assist in retaining lubricant in the cavity. The gasket is mounted in annular member 110 by seating in a groove 116 in the internal periphery of the member. If desired, sleeves 30 and 30' may be splined to or otherwise connected directly to the respective shafts. Further, the sleeves may be on either the driving and driven shafts or on shaft 24 with the respective hubs on the opposite shafts. This would be a reversal of parts and would operate satisfactorily. Shoulders 61 and 62 are not necessary in the roller and ball bearing embodiments since the rollers and balls and their grooves in which they seat will retain the carriages in place.

One of the principal features of the invention described herein, is the combination of the shape of the teeth 56 and the interfit of the teeth in the slot of the free moving carriages 50. By this arrangement, each tooth rolls in the carriage slot rather than sliding against the teeth 58 of the sleeve 32. This, in conjunction with the free movement of carriages 50 in grooves 60 minimizes power loss in the operation of the coupling and more efficiently transmits high torsional power transition without slip and without significantly varying the angular velocity of the driven shaft from that of the driving shaft.

While three embodiments of the present spindle coupling have been described in detail herein, various changes and modifications may be made without departing from the scope of the invention.

I claim:

1. A spindle coupling for connecting two disaligned shafts in driving relation, comprising a sleeve for each of said shafts containing a center cavity and a plurality of spaced grooves in the internal sidewall thereof, carriages slidably mounted in said grooves and having a tooth receiving slot, means between each side of said carriage and the adjacent side of each of said grooves forming a guide for the respective carriage, a spindle shaft interconnecting said sleeves, and a hub at each end of said spindle shaft, each hub having a plurality of teeth disposed around the periphery thereof and extending into the slots of said carriages for engagement with the respective carriage, the teeth of said hub being elongated in the direction of the groove in which the carriages are mounted and the lateral sidewalls of said teeth being of an arcuate configuration forming surfaces for engaging the respective carriage.

2. A spindle coupling as defined in claim 1 in which each of said guide means includes a bearing race spacing the sidewalls of the carriages from the sidewalls of the respective grooves.

3. A spindle coupling as defined in claim 2 in which said bearing race consists of a plurality of balls and a straight cage for retaining said balls in spaced operating relation.

4. A spindle coupling as defined in claim 2 in which each of said carriages has end plates for retaining the bearing races in place along the sides of the carriage.

5. A spindle coupling as defined in claim 3 in which each of said carriages has end plates for retaining the bearing races in place along the sides of the carriage.

6. A spindle coupling as defined in claim 2 in which said bearing race consists of a series of rollers and a cage for retaining said rollers in spaced relation.

7. A spindle coupling as defined in claim 6 in which each of said carriages has end plates for retaining the bearing races in place along the sides of the carriage.

8. A spindle coupling as defined in claim 2 in which the balls extend into elongated recesses along the side of the grooves and into recesses in the sidewalls of the carriages.

9. A spindle coupling as defined in claim 2 in which said race includes a plurality of balls seated in elongated recesses in the sidewalls of the respective spaced groove and in which springs are disposed at each end of said plurality of balls and end plates secured to the ends of the respective carriage hold the springs and balls in place between the carriage and the sidewalls of the groove.

10. A spindle coupling as defined in claim 1 in which said guide means includes an inwardly extending shoulder disposed at the inner edge of the sidewalls of each of the grooves for retaining the carriages in place in said grooves.

11. A spindle coupling as defined in claim 1 in which an annular sealing member is secured to each of the inner ends of each of the sleeves and a flexible seal is disposed on the inner periphery of said annular member for sealing the center cavity of the sleeve around said spindle shaft.

12. A spindle coupling as defined in claim 6 in which an annular sealing member is secured to each of the inner ends of each of the sleeves and a flexible seal is disposed on the inner periphery of said annular member for sealing the center cavity of the sleeve around said spindle shaft.